(12) United States Patent
Matsubara et al.

(10) Patent No.: US 9,341,263 B2
(45) Date of Patent: May 17, 2016

(54) VEHICLE CONTROL DEVICE

(71) Applicant: TOYOTA JIDOSHA KABUSHIKI KAISHA, Toyota-shi, Aichi (JP)

(72) Inventors: Wataru Matsubara, Seto (JP); Hiroya Fujiwara, Nagoya (JP); Akira Hino, Toyota (JP); Shun Minaki, Toyota (JP); Naoto Tanaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/744,898

(22) Filed: Jun. 19, 2015

(65) Prior Publication Data
US 2015/0369361 A1 Dec. 24, 2015

(30) Foreign Application Priority Data

Jun. 20, 2014 (JP) .................................. 2014-127750

(51) Int. Cl.
*F16H 61/14* (2006.01)

(52) U.S. Cl.
CPC ...... *F16H 61/143* (2013.01); *B60W 2510/0208* (2013.01); *B60W 2510/0241* (2013.01); *F16H 2061/145* (2013.01); *Y10T 477/735* (2015.01)

(58) Field of Classification Search
None
See application file for complete search history.

(56) References Cited

U.S. PATENT DOCUMENTS

| | | | | |
|---|---|---|---|---|
| 5,060,769 | A | * | 10/1991 | Yoshimura ............ F16H 61/143 192/3.29 |
| 2005/0222738 | A1 | | 10/2005 | Imamura et al. |
| 2006/0272914 | A1 | | 12/2006 | Nakamura et al. |
| 2009/0055063 | A1 | * | 2/2009 | Nakamura ............ F16H 61/143 701/60 |
| 2010/0170740 | A1 | * | 7/2010 | Lochocki, Jr. ........ F16H 61/143 180/338 |

FOREIGN PATENT DOCUMENTS

| | | |
|---|---|---|
| JP | 2005-291345 A | 10/2005 |
| JP | 2006-336740 A | 12/2006 |
| JP | 2012-047254 A | 3/2012 |
| JP | 2014-013088 A | 1/2014 |

* cited by examiner

*Primary Examiner* — Justin Holmes
(74) *Attorney, Agent, or Firm* — Oliff PLC

(57) ABSTRACT

Vehicle control device of vehicle including lockup clutch configured to directly couple between input/output rotating members of fluid power transmission device transmitting power of engine to automatic transmission, vehicle control device engaging lockup clutch when running state of vehicle in predetermined running state, vehicle control device providing lockup clutch pressure learning control of learning oil pressure of lockup clutch used in start-time lockup slip control in which lockup clutch placed in slip-engaged state toward engaged state at start of vehicle based on rotation speed of engine at time of engagement of lockup clutch, vehicle control device inhibiting engagement of lockup clutch when running state of vehicle in predetermined running state and also in second predetermined running state, vehicle control device engaging lockup clutch after running state of vehicle goes out of second predetermined running state, and providing lockup clutch pressure learning control in engaging process of lockup clutch.

4 Claims, 5 Drawing Sheets

VEHICLE CONTROL DEVICE

CROSS REFERENCE TO RELATED APPLICATION

The present application claims the priority from Japanese Patent Application No. 2014-127750 filed on Jun. 20, 2014, the disclosure of which is herein incorporated by reference in its entirety.

BACKGROUND OF THE INVENTION

1. Field of the Invention

The present invention relates to a control device of a vehicle including a fluid power transmission device having a lockup clutch.

2. Description of Related Art

In a vehicle including a lockup clutch capable of direct coupling between input/output rotating members of a fluid power transmission device transmitting power of an engine to an automatic transmission, a vehicle control device is well-known that provides start-time lockup slip control in which the lockup clutch is placed in a slip-engaged state toward an engaged state at the start of the vehicle. For example, this corresponds to a vehicle control device described in Japanese Laid-Open Patent Publication No. 2014-13088. It is disclosed in Japanese Laid-Open Patent Publication No. 2014-13088 that the lockup clutch is engaged when the a running state of the vehicle is a predetermined running state and that a torque capacity of the lockup clutch is calculated based on an engine rotation speed at the time of engagement of the lockup clutch to learn a lockup clutch oil pressure for the start-time lockup slip control based on a start time point of torque transmission through the lockup clutch determined from a change in the torque capacity.

SUMMARY OF THE INVENTION

If an engine rotation speed varies at the time of engagement of the lockup clutch due to a factor other than the engagement of the lockup clutch such as a shift of an automatic transmission, the torque capacity of the lockup clutch may wrongly be calculated and the accuracy of learning of the lockup clutch oil pressure (oil-pressure learning) may not sufficiently be achieved. In this regard, it is proposed in Patent Document 1 to inhibit the learning of the lockup clutch oil pressure at the vehicle start associated with a larger variation amount of the engine rotation speed and to inhibit the provision of start-time lockup slip control until completion of oil-pressure learning performed at the time of engagement of the lockup clutch during steady running. However, if the oil-pressure learning is simply uniformly inhibited in the running state associated with a large variation amount of the engine rotation speed, the opportunities of oil-pressure learning are reduced and the start-time lockup slip control may not properly be provided. The problem as described above is unknown.

The present invention was conceived in view of the situations and it is therefore an object of the present invention to provide a vehicle control device capable of improving learning accuracy of lockup clutch pressure learning control and capable of suppressing a reduction in learning frequency of the lockup clutch pressure learning control.

To achieve the object, the first aspect of the invention provides a vehicle control device (a) of a vehicle including a lockup clutch configured to directly couple between input/output rotating members of a fluid power transmission device transmitting power of an engine to an automatic transmission, the vehicle control device engaging the lockup clutch when a running state of the vehicle is in a predetermined running state, the vehicle control device providing lockup clutch pressure learning control of learning an oil pressure of the lockup clutch used in start-time lockup slip control in which the lockup clutch is placed in a slip-engaged state toward an engaged state at the start of the vehicle based on a rotation speed of the engine at the time of engagement of the lockup clutch, (b) the vehicle control device inhibiting engagement of the lockup clutch when the running state of the vehicle is in the predetermined running state and also in a second predetermined running state, the vehicle control device engaging the lockup clutch after the running state of the vehicle goes out of the second predetermined running state, and providing the lockup clutch pressure learning control in an engaging process of the lockup clutch.

Consequently, when the lockup clutch pressure learning control is provided, the learning accuracy of the lockup clutch pressure learning control can be improved by inhibiting the engagement of the lockup clutch in the running state in which an excessive variation in the rotation speed of the engine tends to occur during learning due to a shift of the automatic transmission. Additionally, when the lockup clutch pressure learning control is provided, a reduction in the learning frequency of the lockup clutch pressure learning control can be suppressed by not only simply inhibiting the engagement of the lockup clutch in the running state in which an excessive variation in the rotation speed of the engine tends to occur during learning due to a shift of the automatic transmission but also engaging the lockup clutch after a running state is achieved in which the excessive variation hardly occurs during learning.

The second aspect of the invention provides the vehicle control device recited in the first aspect of the invention, wherein the second predetermined running state is a predetermined low vehicle speed state. Consequently, when the lockup clutch pressure learning control is provided, the engagement of the lockup clutch is properly inhibited in the running state in which an excessive variation in the rotation speed of the engine tends to occur during learning due to a shift of the automatic transmission, such as a region in which an upshift of the automatic transmission tends to be made because the vehicle is still in transition of the start.

The third aspect of the invention provides the vehicle control device recited in the first or second aspect of the invention, wherein the second predetermined running state is a state in which a gear ratio of the automatic transmission is equal to or greater than a predetermined value. Consequently, when the lockup clutch pressure learning control is provided, the engagement of the lockup clutch is properly inhibited in the running state in which an excessive variation in the rotation speed of the engine tends to occur during learning due to a shift of the automatic transmission, such as when the gear ratio is still on a low vehicle speed side on which an upshift of the automatic transmission tends to be made.

The fourth aspect of the invention provides the vehicle control device recited in any one of the first to third aspects of the invention, wherein the second predetermined running state is a state in which a change amount of rotation speed of the engine is equal to or greater than a predetermined value. Consequently, when the lockup clutch pressure learning control is provided, the engagement of the lockup clutch is properly inhibited in the running state in which an excessive variation in the rotation speed of the engine tends to occur during learning due to a shift of the automatic transmission.

The fifth aspect of the invention provides the vehicle control device recited in any one of the first to fourth aspects of the invention, wherein when the running state of the vehicle is in the predetermined running state and the lockup clutch pressure learning control is permitted, the lockup clutch is engaged after the running state of the vehicle goes out of the second predetermined running state, and wherein when the running state of the vehicle is in the predetermined running state and the lockup clutch pressure learning control is not permitted, the lockup clutch is engaged regardless of whether the running state of the vehicle is in the second predetermined running state. Consequently, since the control of temporarily inhibiting the engagement of the lockup clutch is limited to only during the lockup clutch pressure learning control, the lockup clutch is engaged when the running state of the vehicle is in the original predetermined running state while the lockup clutch pressure learning control is not provided and, therefore, the deterioration in practical fuel efficiency of the vehicle is suppressed.

The sixth aspect of the invention provides the vehicle control device recited in any one of the first to fifth aspects of the invention, wherein a torque capacity of the lockup clutch is calculated based on a rotation speed of the engine during engaging the lockup clutch, and wherein the lockup clutch pressure learning control is provided based on a start time point of torque transmission through the lockup clutch determined based on the torque capacity. Consequently, when the lockup clutch is engaged, the lockup clutch pressure learning control is properly provided based on the rotation speed of the engine.

DETAILED DESCRIPTION OF A PREFERRED EMBODIMENT

An example of the present invention will now be described in detail with reference to the drawings.

Embodiment

Figure 1:
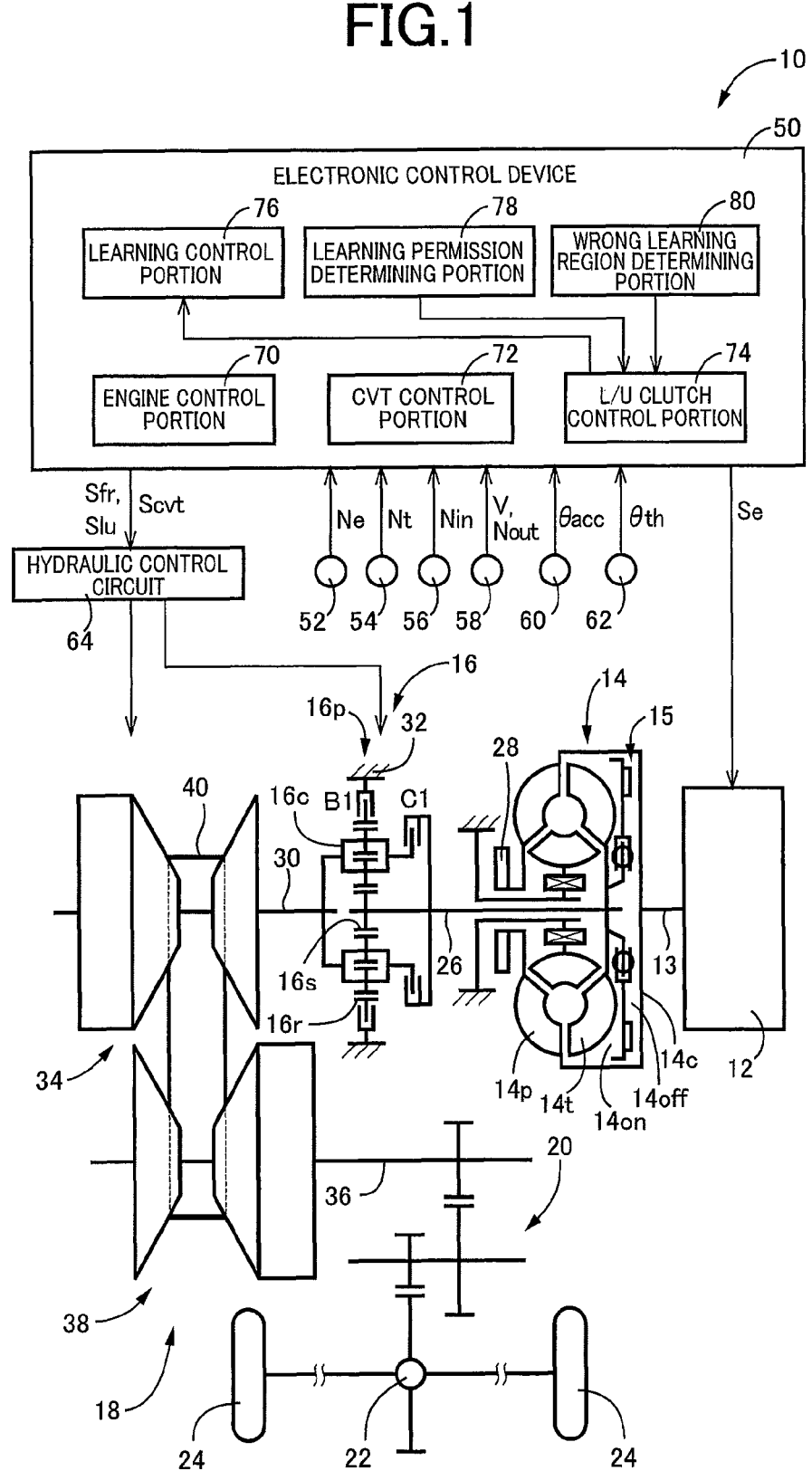
FIG. 1 is a diagram for explaining a general configuration of a vehicle to which the present invention is applied and is a diagram for explaining main portions of a control function and a control system for various types of control in the vehicle.

FIG. 1 is a diagram for explaining a general configuration of a vehicle 10 to which the present invention is applied and is a diagram for explaining main portions of a control function and a control system for various types of control in the vehicle 10. In FIG. 1, the vehicle 10 includes an engine 12 as a drive power source for running, a torque converter 14 as a fluid power transmission device, a forward/backward switching device 16, a belt type continuously variable transmission 18 (hereinafter referred to as a continuously variable transmission 18) as an automatic transmission, a reduction gear device 20, a differential gear device 22, and left and right drive wheels 24. Power output from the engine 12 in the vehicle 10 is transmitted sequentially via the torque converter 14, the forward/backward switching device 16, the continuously variable transmission 18, the reduction gear device 20, and the differential gear device 22 to the left and right drive wheels 24.

The torque converter 14 includes a pump impeller 14$p$ coupled to the engine 12 and a turbine impeller 14$t$ coupled to the forward/backward switching device 16 via a turbine shaft 26 and transmits power via fluid between the pump impeller 14$p$ and the turbine impeller 14$t$. In the torque converter 14, the pump impeller 14$p$ corresponds to an input rotating member while the turbine impeller 14$t$ corresponds to an output rotating member, and the power of the engine 12 is transmitted via fluid toward the continuously variable transmission 18. The torque converter 14 is provided with a lockup clutch 15 (hereinafter referred to as an L/U clutch 15) capable of direct coupling between the pump impeller 14$p$ and the turbine impeller 14$t$ (i.e., between input/output rotating members of the torque converter 14). The pump impeller 14$p$ is coupled to a mechanical oil pump 28 rotationally driven by the engine 12 to generate a hydraulic oil pressure acting as an original pressure for controlling a shift of the continuously variable transmission 18, controlling actuation of the L/U clutch 15, or supplying lubrication oil to the portions.

As is well known, the L/U clutch 15 is a hydraulic friction clutch frictionally engaged with a front cover 14$c$ by controlling a differential pressure $\Delta P$ (=Pon−Poff) between an oil pressure Pon in an engagement-side oil chamber 14 on and an oil pressure Poff in a release-side oil chamber 14 off. Actuation states of the L/U clutch 15 are broadly classified into three states, which are, for example, so-called lockup release (lockup-off, L/U-off) when the differential pressure $\Delta P$ is made negative to release the L/U clutch 15, so-called lockup slip (L/U-slip) when the differential pressure $\Delta P$ is made equal to or greater than zero to semi-engage (slip-engage) the L/U clutch 15 with a slip, and a so-called lockup state (lockup-on, L/U-on) when the differential pressure $\Delta P$ is set to the maximum value to completely engage the L/U clutch 15. When the L/U clutch 15 is put into the L/U-off, the torque converter 14 can produce a torque amplification effect. When the L/U clutch 15 is put into the L/U-on, the pump impeller 14$p$ and the turbine impeller 14$t$ are integrally rotated to directly transmit the power of the engine 12 toward the forward/backward switching device 16. When the L/U clutch 15 is put into the L/U-slip, the turbine shaft 26 is rotated by following a crankshaft 13 of the engine 12 with a predetermined slip amount Ns (=engine rotation speed Ne−turbine rotation speed Nt) during drive (power-on) of the vehicle 10, while the crankshaft 13 of the engine is rotated by following the turbine shaft 26 with a predetermined slip amount during non-drive (power-off) of the vehicle 10. In the L/U-slip of the L/U clutch 15, a torque share of the L/U clutch 15 is eliminated by setting the differential pressure $\Delta P$ to zero, for example, and the torque converter 14 is under the operation condition equivalent to the L/U-off.

The forward/backward switching device 16 includes a forward clutch C1, a backward brake B1, and a double-pinion type planetary gear device 16$p$. The turbine shaft 26 of the torque converter 14 is integrally coupled to a sun gear 16$s$ of the planetary gear device 16$p$, and an input shaft 30 of the continuously variable transmission 18 is integrally coupled to a carrier 16c of the planetary gear device 16p. The carrier 16c and the sun gear 16s are selectively coupled via the forward clutch C1, and a ring gear 16r of the planetary gear device 16p is selectively fixed via the backward brake B1 to a housing 32 that is a non-rotating member. The forward clutch C1 and the backward brake B1 are known hydraulic friction engagement devices. When the forward clutch C1 is engaged and the backward brake B1 is released in the forward/backward switching device 16, the forward/backward switching device 16 is integrally rotated to directly couple the turbine shaft 26 and the input shaft 30 so that a forward power transmission path is established (achieved). When the backward brake B1 is engaged and the forward clutch C1 is released in the forward/backward switching device 16, a backward power transmission path is established and the input shaft 30 is rotated in the direction opposite to a rotating direction of the turbine shaft 26. When both the forward clutch C1 and the backward brake B1 are released, the forward/backward switching device 16 is put into a neutral state (power transmission interruption state) in which power transmission is interrupted.

The continuously variable transmission 18 includes a primary pulley 34 having a variable effective diameter disposed on the input shaft 30, a secondary pulley 38 having a variable effective diameter disposed on an output shaft 36, and a power transmission belt 40 wound between the paired pulleys 34, 38. The continuously variable transmission 18 makes up a portion of a power transmission path between the forward/backward switching device 16 and the drive wheels 24, and power is transmitted via a friction force between the pair of the pulleys 34, 38 and the power transmission belt 40. In the continuously variable transmission 18, when V-groove widths of the pair of the pulleys 34, 38 are varied to change a winding diameter (effective diameter) of the power transmission belt 40, a gear ratio γ (=input shaft rotation speed Nin/ output shaft rotation speed Nout) is continuously varied while the friction force (belt clamping pressure) between the pair of the pulleys 34, 38 and the power transmission belt 40 is controlled so as not to generate a slip of the power transmission belt 40.

The vehicle 10 includes an electronic control device 50 including a control device of the vehicle 10 providing lockup clutch pressure learning control (hereinafter referred to as L/U clutch pressure learning control) described later, for example. The electronic control device 50 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various types of control for the vehicle 10. For example, the electronic control device 50 provides output control of the engine 12, shift control of the continuously variable transmission 18, actuation control of the L/U clutch 15, etc., and may be configured as mutually independent control units for engine control, hydraulic control of the continuously variable transmission 18 and the L/U clutch 15, etc., as needed. The electronic control device 50 is supplied with various input signals (e.g., the engine rotation speed Ne that is a rotation speed of the engine 12, the turbine rotation speed Nt that is a rotation speed of the turbine shaft 26, the input shaft rotation speed Nin that is a rotation speed of the input shaft 30, the output shaft rotation speed Nout that is a rotation speed of the output shaft 36 corresponding to a vehicle speed V, an accelerator opening degree θacc that is an operation amount of an accelerator operating member, and a throttle valve opening degree θth that is an opening degree of an electronic throttle valve) based on detection values detected by various sensors (e.g., rotation speed sensors 52, 54, 56, 58, an accelerator opening degree sensor 60, and a throttle valve opening degree sensor 62) provided in the vehicle 10. The electronic control device 50 supplies devices (e.g., the engine 12 and a hydraulic control circuit 64) provided in the vehicle 10 with various output signals (e.g., an engine control command signal Se for the output control of the engine 12, a CVT control command signal Scvt for the hydraulic control related to a shift of the continuously variable transmission 18 etc., an L/U clutch control pressure Slu as an L/U clutch control command signal for the hydraulic control related to an engagement actuation of the L/U clutch 15, and a forward/backward control command signal Sfr for the hydraulic control related to engagement actuations of the forward clutch C1 and the backward brake B1).

The differential pressure ΔP controlled by the hydraulic control circuit 64 based on the L/U clutch control pressure Slu is an oil pressure value representative of the actuation state (L/U-off, L/U-slip, L/U-on) of the L/U clutch 15 and is defined as an L/U clutch pressure Plu in this example. This L/U clutch pressure Plu is also an oil pressure value corresponding to the slip amount Ns of the L/U clutch 15 and a torque capacity (hereinafter referred to as an L/U clutch torque) Tlu of the L/U clutch 15. The L/U clutch control pressure Slu is an oil pressure command value of the L/U clutch pressure Plu and is oil pressure of the L/U clutch 15 learnt in the L/U clutch pressure learning control described later. The L/U clutch torque Tlu is the largest torque value that can be transmitted by the L/U clutch 15 and is different from an L/U clutch transmission torque that is a torque value actually transmitted by the L/U clutch 15 to be exact; however, the both torques are treated as the same torque for convenience if not particularly distinguished. The L/U clutch transmission torque has the same meaning as an L/U clutch sharing torque that is a torque value when the torque transmitted through a power transmission path between the engine 12 and the forward/backward switching device 16 is transmitted by the L/U clutch 15 along with the torque converter 14 sharing the torque.

The electronic control device 50 includes an engine control means, i.e., an engine control portion 70, a CVT control means, i.e., a CVT control portion 72, and an L/U clutch control means, i.e., an L/U clutch control portion 74.

The engine control portion 70 outputs the engine control command signal Se to each of a throttle actuator, a fuel injection device, and an ignition device for the output control of the engine 12, for example. Specifically, the engine control portion 70 sets a target engine torque Tetgt for acquiring a request drive force (synonymous with a request drive torque) calculated based on the accelerator opening degree θacc and the vehicle speed V, controls opening/closing of the electronic throttle valve through the throttle actuator so as to acquire the target engine torque Tetgt, controls a fuel injection amount through the fuel injection device, and controls an ignition timing through the ignition device.

Figure 2:
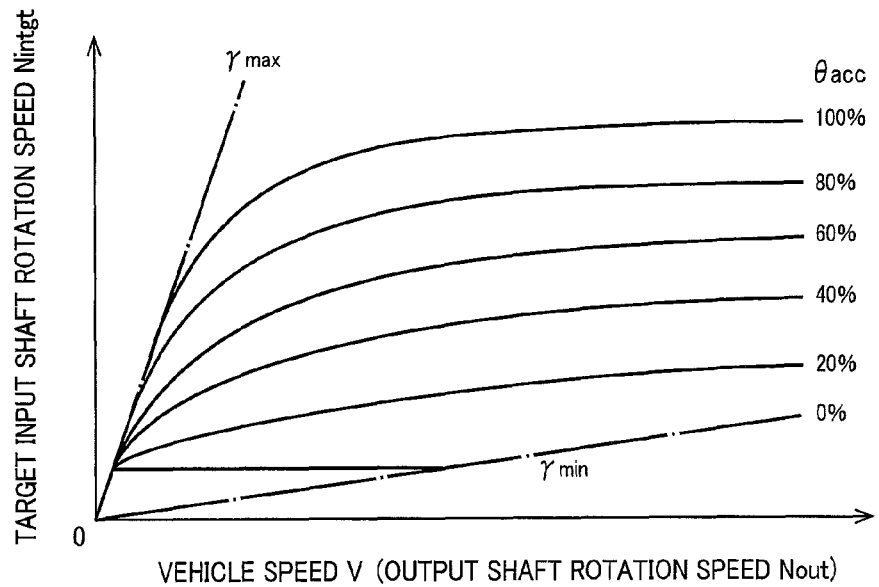
FIG. 2 is an example of a shift map used to calculate a target input shaft rotation speed in shift control of a continuously variable transmission.

The CVT control portion 72 outputs the CVT control command signal Scvt to the hydraulic control circuit 64 for the shift control and the belt clamping pressure control of the continuously variable transmission 18, for example. Specifically, the CVT control portion 72 sets a target input shaft rotation speed Nintgt based on a running state of the vehicle 10 indicated by the actual vehicle speed V and the accelerator opening degree θacc from a shift map preliminarily obtained from experimentation or design and stored (i.e., predefined) as depicted in FIG. 2. The CVT control portion 72 performs a shift of the continuously variable transmission 18 through feedback control such that the actual input shaft rotation speed NM matches the target input shaft rotation speed Nintgt. Additionally, the CVT control portion 72 controls the belt clamping pressure to a lowest possible value for fuel efficiency improvement in a range without occurrence of a belt slip.

Figure 3:
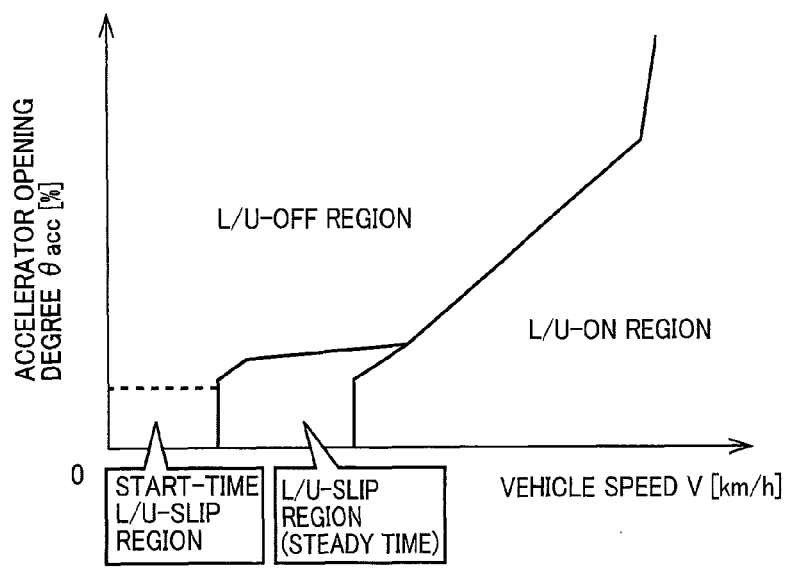
FIG. 3 is an example of a lockup region diagram used when actuation control of an L/U clutch is provided.

The L/U clutch control portion 74 commands the hydraulic control circuit 64 to output the L/U clutch control pressure Slu for the actuation control of the L/U clutch 15, for example. Specifically, the L/U clutch control portion 74 controls the actuation state of the L/U clutch 15 based on the running state of the vehicle 10 indicated by the actual vehicle speed V and the accelerator opening degree θacc from a predefined relationship (map, lockup region diagram) as depicted in FIG. 3. The L/U clutch control portion 74 puts the L/U clutch 15 into the L/U-off when the running state of the vehicle 10 is in an L/U-off region, puts the L/U clutch 15 into the L/U-slip when the running state of the vehicle 10 is in an L/U-slip region, and puts the L/U clutch 15 into the L/U-on when the running state of the vehicle 10 is in an L/U-on region defined as a predetermined running state. In a relatively high vehicle speed region, the L/U clutch 15 is put into the L/U-on to eliminate a slip loss (internal loss) of the torque converter 14 and the fuel efficiency is improved. In a relatively low/medium vehicle speed region, the L/U clutch 15 is put into the L/U-slip (i.e., an L/U actuation region is expanded) to improve a transmission efficiency of the torque converter 14 and the fuel efficiency is improved. Therefore, since the L/U-slip can be considered as one form of the L/U-on, the predetermined running state for putting the L/U clutch 15 into the L/U-on may include the L/U-slip region. If the L/U clutch 15 is put into the L/U-slip, the L/U clutch control portion 74 controls the L/U clutch pressure Plu through feedback control such that the actual slip amount Ns of the L/U clutch 15 becomes equal to a target slip amount Nstgt.

To achieve a fuel efficiency improvement by utilizing a low-rotation speed high-torque region with a relatively high engine combustion efficiency, for example, at the vehicle start associated with turning on of an accelerator, the L/U clutch control portion 74 provides start-time lockup slip control (start-time L/U-slip control) in which the L/U clutch 15 is put into the L/U-slip toward the L/U-on so that a rise (rev-up) of the engine rotation speed Ne is suppressed. For example, when a predefined start-time L/U-slip control start condition is satisfied, this start-time L/U-slip control suppresses the rev-up of the engine rotation speed Ne so as to satisfy both the fuel efficiency and the power performance depending on the accelerator opening degree θacc, thereby suppressing fuel consumption. The start-time L/U-slip control start condition is satisfaction of all the following conditions, i.e., whether a shift lever is at a "D" position, whether a brake is turned off, whether the accelerator is turned on from a state in which the vehicle 10 is determined as being stopped, and whether the running state is in a start-time L/U-slip region, for example. Since the start-time L/U-slip control is the control of restraining the engine rotation speed Ne from temporarily increasing in accordance with turning on of the accelerator, the start-time L/U-slip control is desirably provided, for example, at the vehicle start associated with turning on of the accelerator the opening degree θacc of which is a relatively low opening degree, so that a driver hardly has a feeling of uncomfortableness in terms of vehicle acceleration feeling from the turning on of the accelerator. Therefore, for example, as depicted in the lockup region diagram of FIG. 3, the start-time L/U-slip region is defined in advance in a region that is on the lower vehicle speed side as compared to the L/U-slip region and that has the accelerator opening degree θacc within a predetermined low opening degree. In this example, the control of putting the L/U clutch 15 into the L/U-slip described above provided during steady running (normal running) other than the time of vehicle start is referred to as steady-time L/U-slip control. The L/U-slip region for determining the provision of the steady-time L/U-slip control is described as an L/U-slip region (steady time).

In L/U-slip/on control in which the L/U clutch 15 is controlled from the L/U-off toward L/U-on (the start-time L/U-slip control, the steady-time L/U-slip control in the case of not continuing to the start-time L/U-slip control, and L/U control at steady time in which the L/U clutch 15 is put into the L/U-on in the case of not continuing to the steady-time L/U-slip control), the L/U clutch control portion 74 provides feedforward control of setting the L/U clutch control pressure Slu corresponding to the accelerator opening degree θacc at the start of provision of the L/U-slip/on control, for example. For the L/U clutch control pressure Slu at the start of provision of the L/U-slip/on control, for example, a constant standby pressure maintained at a constant value is set. This constant standby pressure is set such that, with regard to a torque transmission start time defined as, for example, a time from the start of provision of the L/U-slip control until a time point when the torque transmission is actually started in the L/U clutch 15 (hereinafter referred to as a start time point of torque transmission through the L/U clutch 15), the torque transmission start time is set to a predefined target time for satisfying both the suppression of shock and the suppression of rev-up of the engine rotation speed Ne.

Solenoid valves etc. in the hydraulic control circuit 64 outputting the L/U clutch pressure Plu based on the L/U clutch control pressure Slu originally have hardware variations to some extent in quality and variations are accordingly generated in the L/U clutch torque Tlu for the L/U clutch control pressure Slu. Therefore, torque fluctuation and shock may occur due to the hardware variations. For hardware variations and aged deterioration, the electronic control device 50 provides the L/U clutch pressure learning control of learning the constant standby pressure of the L/U clutch control pressure Slu.

Specifically, returning to FIG. 1, the electronic control device 50 further includes a learning control means, i.e., a learning control portion 76, providing the L/U clutch pressure learning control.

Figure 4:
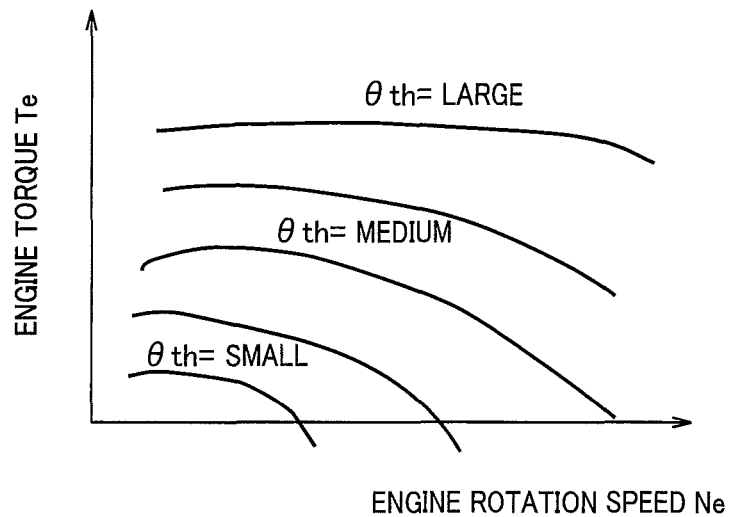
FIG. 4 is an example of an engine torque map used to calculate an engine torque.
Figure 5:
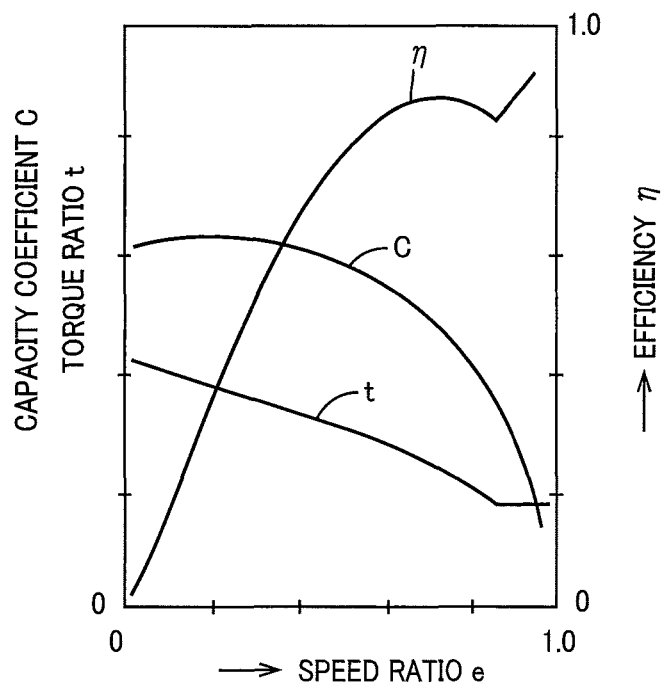
FIG. 5 is a diagram illustrating a relationship between a capacity coefficient and a speed ratio of a torque converter.

The learning control portion 76 calculates the L/U clutch torque Tlu based on the engine rotation speed Ne from the following Equation (1), for example, during the L/U-slip/on control provided by the L/U clutch control portion 74 (i.e., in an engaging process of the L/U clutch 15 during the L/U-slip/on control). Equation (1) is a known equation of equilibrium of the torque converter 14. A second term of the right side of Equation (1) represents a torque capacity of the torque converter 14 and C is a capacity coefficient of the torque converter 14. A third term of the right side of Equation (1) represents an inertia torque and Ie is a predefined engine rotating portion inertia moment (engine inertia). The learning control portion 76 calculates an engine torque Te of a first term of the right side of Equation (1) based on the actual engine rotation speed Ne and throttle valve opening degree θth from a predefined relationship (engine torque map) as depicted in FIG. 4, for example. The learning control portion 76 calculates the capacity coefficient C of the torque converter 14 based on a speed ratio e of the torque converter 14 (=the turbine rotation speed Nt/the engine rotation speed Ne) from a predefined relationship (an actuation characteristic diagram of the torque converter 14) as depicted in FIG. 5, for example, and calculates the torque capacity of the torque converter 14 of the second term of the right side of Equation (1) based on the capacity coefficient C and the engine rotation speed Ne. The learning control portion 76 calculates the inertia torque of the third term of the right side of Equation (1) based on the engine inertia Ie and the engine rotation speed Ne, for example.

$$Tlu=Te-C \times Ne^2-Ie \times (dNe/dt) \quad (1)$$

The learning control portion 76 determines whether the L/U clutch torque Tlu calculated by using Equation (1) changes from zero to a positive value, for example. The learning control portion 76 measures the torque transmission start time from the start of provision of the L/U-slip/on control by the L/U clutch control portion 74 until a time point when it is determined that the L/U clutch torque Tlu changes to a positive value (i.e., the start time point of torque transmission through the L/U clutch 15 determined based on determination of the L/U clutch torque Tlu changing to a positive value), and determines whether the torque transmission start time is the predefined target time. If it is determined that the torque transmission start time is the target time, the learning control portion 76 does not correct the next constant standby pressure of the L/U clutch control pressure Slu used in the L/U-slip/on control by the L/U clutch control portion 74. On the other hand, if it is determined that the torque transmission start time is shorter than the target time, the learning control portion 76 corrects the next constant standby pressure of the L/U clutch control pressure Slu used in the L/U-slip/on control by the L/U clutch control portion 74 such that the constant standby pressure is reduced by a predetermined value defined in advance, for suppressing a vehicle shock, for example. In contrast, if it is determined that the torque transmission start time is longer than the target time, the learning control portion 76 corrects the next constant standby pressure of the L/U clutch control pressure Slu used in the L/U-slip/on control by the L/U clutch control portion 74 such that the constant standby pressure is increased by a predetermined value defined in advance, for suppressing the rev-up of the engine rotation speed Ne, for example.

Although whether the L/U clutch torque Tlu changes from zero to a positive value is determined by determining whether Tlu>0 is satisfied, a predefined "predetermined value" close to zero may be used instead of "0" from the viewpoint of suppressing the effect of signal noises and securing a certain margin for estimated errors of the L/U clutch torque Tlu, the engine torque Te, etc. The target time used for comparison with the torque transmission start time is preferably a target time slot having a certain time width from the viewpoint of suppressing the effect of signal noises and securing a certain margin for estimated errors of the L/U clutch torque Tlu, the engine torque Te, etc., and then the determination condition is whether the torque transmission start time is within the target time slot.

When the engine rotation speed Ne is varied due to a shift of the continuously variable transmission 18 during the L/U-slip/on control provided by the L/U clutch control portion 74, the L/U clutch torque Tlu may wrongly be calculated and the constant standby pressure of the L/U clutch control pressure Slu may wrongly be learnt in the L/U clutch pressure learning control by the learning control portion 76. Particularly, at the vehicle start, an upshift is likely to be made from the maximum gear ratio (the lowest-vehicle-speed-side gear ratio, the lowest-side gear ratio) γmax. Therefore, the learning of the L/U clutch control pressure Slu used in the start-time L/U-slip control is performed when the steady-time L/U-slip control or the L/U control at the steady time is provided rather than when the start-time L/U-slip control itself is provided. As described above, the learning control portion 76 provides the L/U clutch pressure learning control of learning the L/U clutch control pressure Slu used in the steady-time L/U-slip control during the L/U control at the steady time (including the steady-time L/U-slip control) provided by the L/U clutch control portion 74, based on the engine rotation speed Ne (e.g., based on the start time point of torque transmission through the L/U clutch 15 determined based on the L/U clutch torque Tlu, which is calculated based on the engine rotation speed Ne).

Even during the L/U control at the steady time, the running state of the vehicle 10 may be in a region in which wrong learning of the constant standby pressure of the L/U clutch control pressure Slu tends to occur during the L/U clutch pressure learning control (hereinafter referred to as a wrong learning region). Therefore, if the running state of the vehicle 10 is within the L/U-on region (including the L/U-slip region) and is also in a second predetermined running state, the electronic control device 50 inhibits the L/U control at the steady time. If the L/U control at the steady time is simply inhibited, a learning frequency of the L/U clutch pressure learning control is reduced. Therefore, the electronic control device 50 inhibits the L/U control at the steady time until the running state of the vehicle 10 goes out of the second predetermined running state, and provides the L/U control at the steady time after the running state of the vehicle 10 goes out of the second predetermined running state, thereby providing the L/U clutch pressure learning control in the engaging process of the L/U clutch 15 during the L/U control. The second predetermined running state is a running state defined in advance as a running state in which it is predicted that the running state of the vehicle 10 has the engine rotation speed Ne varied by a predetermined value or more due to a shift of the continuously variable transmission 18, for example. More specifically, the second predetermined running state is a running state in which an excessive variation in the engine rotation speed Ne tends to occur due to a shift of the continuously variable transmission 18 such as a region in which an upshift tends to be made from the maximum gear ratio γmax, for example, and is a running state in which the vehicle speed V is equal to or less than a predetermined vehicle speed (i.e., a predetermined low vehicle speed state) such as the vehicle is still at a low vehicle speed as in the case of transition of the vehicle start, for example. Additionally or alternatively, the second predetermined running state is a running state in which the gear ratio γ of the continuously variable transmission 18 is equal to or greater than a predetermined value such as a gear ratio is still on the low vehicle speed side so that an upshift tends to be made, for example.

If the temporary inhibition of the L/U control at the steady time is limited to only when the L/U clutch pressure learning control is provided, the L/U control at the steady time is provided when the L/U clutch pressure learning control is not provided and the running state of the vehicle 10 is within the L/U-on region. Therefore, if the running state of the vehicle 10 is within the L/U-on region and the L/U clutch pressure learning control is permitted, the electronic control device 50 provides the L/U control at the steady time after the running state of the vehicle 10 goes out of the second predetermined running state, and executes a sequence of the L/U clutch pressure learning control described above. On the other hand, if the running state of the vehicle 10 is within the L/U-on region and the L/U clutch pressure learning control is not permitted, the electronic control device 50 provides the L/U control at the steady time regardless of whether the running state of the vehicle 10 is in the second predetermined running state.

Specifically, returning to FIG. 1, the electronic control device 50 further includes a learning permission determining means, i.e., a learning permission determining portion 78, and a wrong learning region determining means, i.e., a wrong learning region determining portion 80.

For example, when the L/U clutch control portion 74 determines that the running state of the vehicle 10 is within the L/U-on region, the learning permission determining portion 78 determines whether the provision of the L/U clutch pressure learning control is permitted based on whether predetermined learning permission conditions are satisfied for the L/U clutch pressure learning control of learning the L/U clutch control pressure Slu used in the start-time L/U-slip control. Since the L/U clutch control pressure Slu used in, for example, the start-time L/U-slip control is learnt, the predetermined learning permission conditions are defined as conditions close to the start-time L/U-slip control start condition. Specifically, the predetermined learning permission conditions are that the throttle valve opening degree θth (or the accelerator opening degree θacc) is within a low opening degree region equal to or less than a predetermined opening degree, that a change amount (i.e., a change rate) of the throttle valve opening degree θth (or the accelerator opening degree θacc) per unit time is at a low change rate equal to or less than a predetermined change amount, and that the engine torque Te is within a low torque region equal to or less than a predetermined torque.

If the learning permission determining portion 78 permits the provision of the L/U clutch pressure learning control, the wrong learning region determining portion 80 determines whether the running state of the vehicle 10 is in the wrong learning region based on whether the running state of the vehicle 10 is in the second predetermined running state. This wrong learning region is, for example, a low vehicle speed region that is a region in which an upshift tends to be made from the maximum gear ratio γmax and in which the vehicle speed V is equal to or less than the predetermined vehicle speed, and/or, for example, a low-side gear ratio region that is a region in which an upshift tends to occur and in which the gear ratio γ of the continuously variable transmission 18 is equal to or greater than the predetermined value.

If the wrong learning region determining portion 80 determines that the running state is in the wrong learning region, the L/U clutch control portion 74 inhibits the L/U control at the steady time and does not provide the L/U control until the wrong learning region determining portion 80 determines that the running state is not in the wrong learning region. On the other hand, if the wrong learning region determining portion 80 determines that the running state is not in the wrong learning region, the L/U clutch control portion 74 provides the L/U control at the steady time. If the learning permission determining portion 78 permits the provision of the L/U clutch pressure learning control, the learning control portion 76 provides the L/U clutch pressure learning control during the L/U control at the steady time by the L/U clutch control portion 74. On the other hand, if the learning permission determining portion 78 does not permit the provision of the L/U clutch pressure learning control, the L/U clutch control portion 74 provides the L/U control at the steady time regardless of whether the running state of the vehicle 10 is in the wrong learning region.

Figure 6:
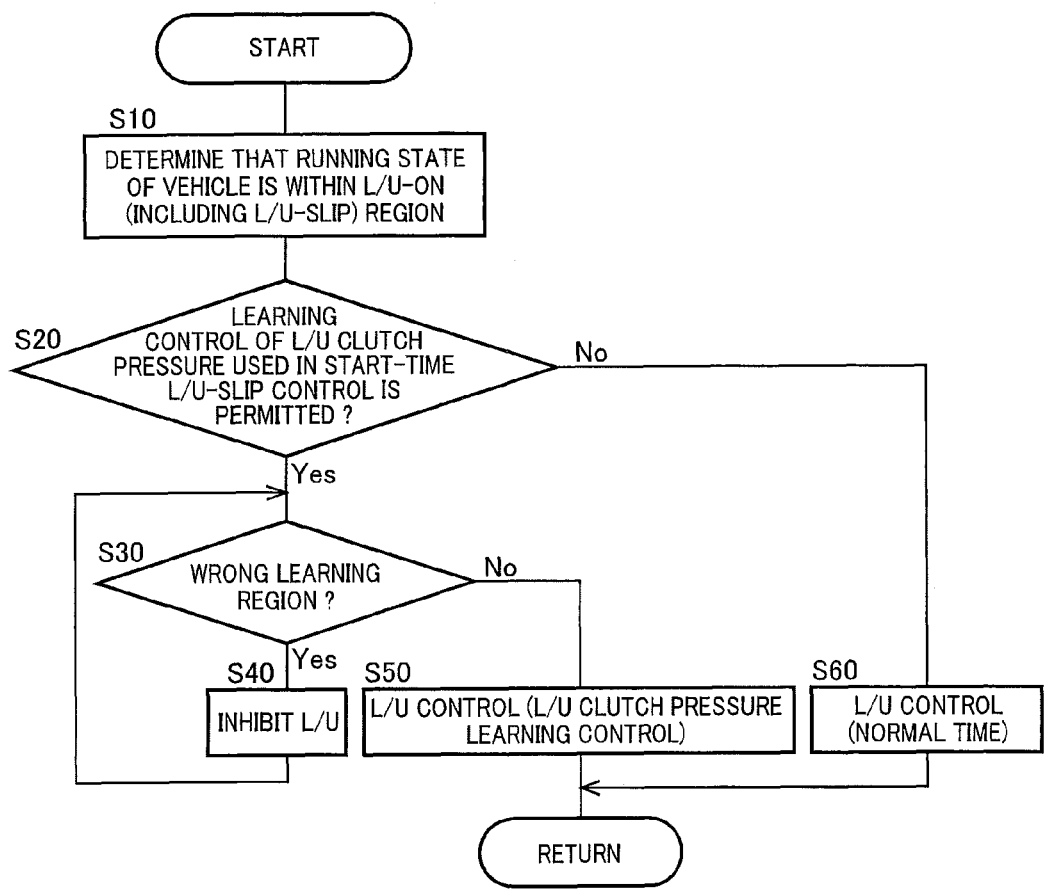
FIG. 6 is a flowchart for explaining a main portion of the control operation of an electronic control device, i.e., the control operation for improving the learning accuracy of L/U clutch pressure learning control and suppressing a reduction in learning frequency of the L/U clutch pressure learning control.
Figure 7:
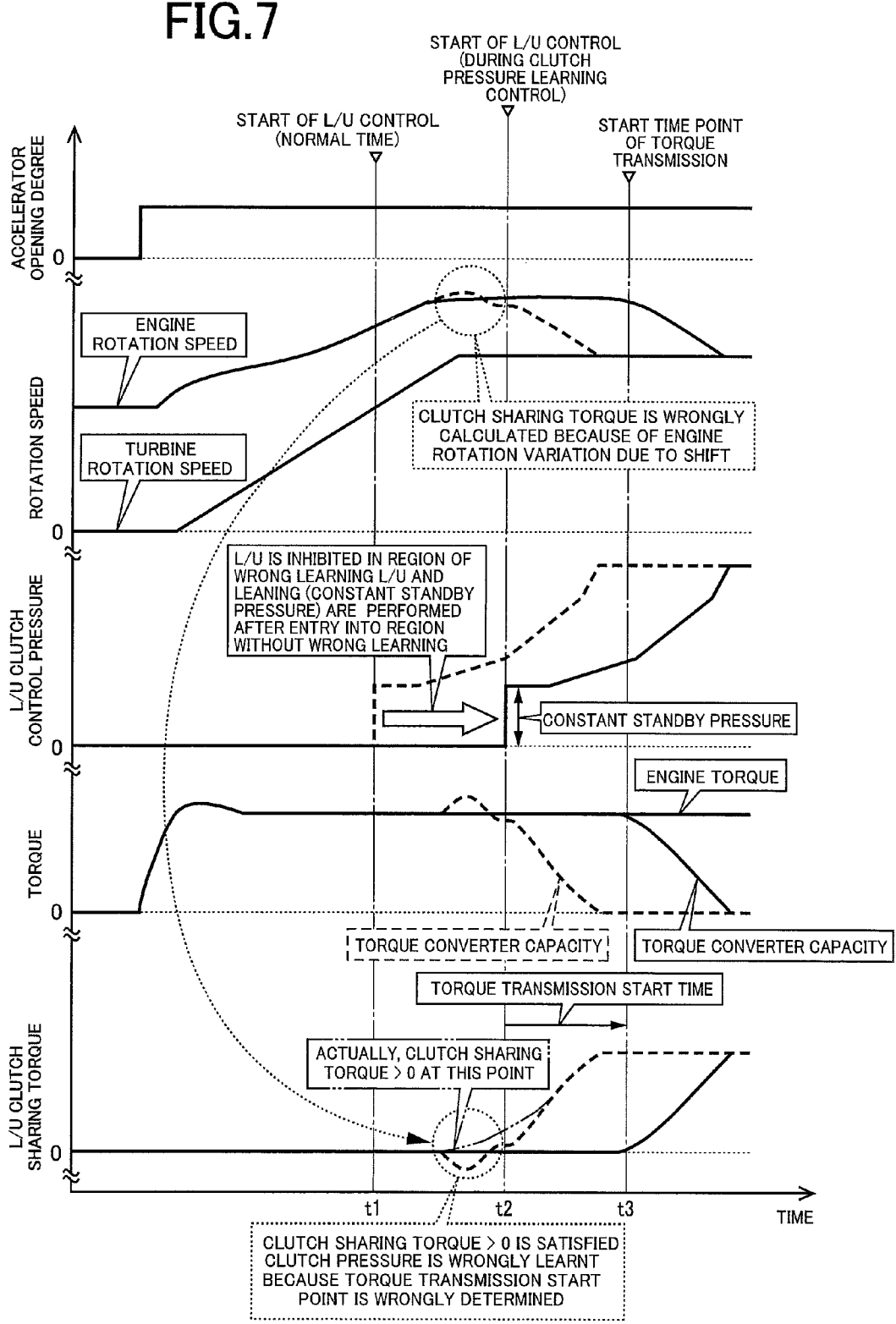
FIG. 7 is an example of a time chart when the control operation depicted in the flowchart of FIG. 6 is executed.

FIG. 6 is a flowchart for explaining a main portion of the control operation of the electronic control device 50, i.e., the control operation for improving the learning accuracy of the L/U clutch pressure learning control and suppressing a reduction in learning frequency of the L/U clutch pressure learning control, and is repeatedly executed with an extremely short cycle time, for example, on the order of a few msec to a few tens of msec. FIG. 7 is an example of a time chart when the control operation depicted in the flowchart of FIG. 6 is executed.

In FIG. 6, first, step (hereinafter, step will be omitted) S10 corresponding to the L/U clutch control portion 74 indicates that, for example, the running state of the vehicle 10 is determined as being within the L/U-on region. At S20 corresponding to the learning permission determining portion 78, it is determined whether it is permitted to provide the L/U clutch pressure learning control of learning the L/U clutch control pressure Slu for the start-time L/U-slip control, for example. If the determination of S20 is affirmative, at S30 corresponding to the wrong learning region determining portion 80, it is determined whether the running state of the vehicle 10 is in the wrong learning region, for example. If the determination of S30 is affirmative, at S40 corresponding to the L/U clutch control portion 74, for example, the L/U control at the steady time is inhibited. During execution of S40, S30 is repeatedly executed. In contrast, if the determination of S30 is negative, at S50 corresponding to the L/U clutch control portion 74 and the learning control portion 76, for example, the L/U control at the steady time is provided and the L/U clutch pressure learning control is provided during the L/U control. On the other hand, if the determination at S20 is negative, at S60 corresponding to the L/U clutch control portion 74, for example, the L/U control at the steady time is provided.

In FIG. 7, a broken line is an example when the provision of the L/U clutch pressure learning control is not permitted and a solid line is an example when the provision of the L/U clutch pressure learning control is permitted. If the running state of the vehicle 10 is within the L/U-on region and the provision of the L/U clutch pressure learning control is not permitted, the L/U control at the steady time is started at normal timing (see time t1). If a shift of the continuously variable transmission 18 is performed during this L/U control, the engine rotation speed Ne is varied as indicated by the broken line and, therefore, if the L/U clutch pressure learning control is provided during this L/U control, the constant standby pressure of the L/U clutch control pressure Slu is wrongly learnt. Thus, even when the running state of the vehicle 10 is within the L/U-on region, the L/U control is inhibited in the wrong learning region if the provision of the L/U clutch pressure learning control is permitted, and the L/U control is started as indicated by a solid line after the running state goes out of the wrong learning region (see time t2). Since a shift of the continuously variable transmission 18 is suppressed or avoided during this L/U control, the L/U clutch pressure learning control is accurately provided. Since the L/U control is inhibited only when the running state of the vehicle 10 is within the wrong learning region, the opportunity of providing the L/U clutch pressure learning control is properly ensured. Since the L/U control in the wrong learning region is inhibited only when the provision of the L/U clutch pressure learning control is permitted, if the provision of the L/U clutch pressure learning control is not permitted, the L/U control is promptly started when the running state of the vehicle 10 is within the L/U-on region.

As described above, according to this example, when the L/U clutch pressure learning control is provided, the learning accuracy of the L/U clutch pressure learning control can be improved by inhibiting the engagement of the L/U clutch 15 in the running state in which an excessive variation in the engine rotation speed Ne tends to occur during learning due to a shift of the continuously variable transmission 18. Additionally, when the L/U clutch pressure learning control is provided, a reduction in the learning frequency of the L/U clutch pressure learning control can be suppressed by not only simply inhibiting the engagement of the L/U clutch 15 in the running state in which an excessive variation in the engine rotation speed Ne tends to occur during learning due to a shift of the continuously variable transmission 18 but also engaging the L/U clutch 15 after a running state is achieved in which the excessive variation hardly occurs during learning.

According to this example, since the second predetermined running state is the predetermined low vehicle speed state, when the L/U clutch pressure learning control is provided, the engagement of the L/U clutch 15 is properly inhibited in the running state in which an excessive variation in the engine rotation speed Ne tends to occur during learning due to a shift of the continuously variable transmission 18, such as a region in which an upshift of the continuously variable transmission 18 tends to be made because the vehicle is still in transition of the start.

According to this example, since the second predetermined running state is a state in which the gear ratio γ of the continuously variable transmission 18 is equal to or greater than the predetermined value, when the L/U clutch pressure learning control is provided, the engagement of the L/U clutch 15 is properly inhibited in the running state in which an excessive variation in the engine rotation speed Ne tends to occur during learning due to a shift of the continuously variable transmission 18, such as when the gear ratio is still on the low side on which an upshift of the continuously variable transmission 18 tends to be made.

According to this example, since the control of temporarily inhibiting the engagement of the L/U clutch 15 is limited to only during the L/U clutch pressure learning control, the L/U clutch 15 is engaged when the running state of the vehicle 10 is in the original predetermined running state while the L/U clutch pressure learning control is not provided and, therefore, the deterioration in practical fuel efficiency of the vehicle 10 is suppressed.

According to this example, when the L/U clutch 15 is engaged, the L/U clutch pressure learning control is properly provided based on the engine rotation speed Ne.

Although the example of the present invention has been described in detail with reference to the drawings, the present invention is applied in other forms.

For example, in the example, the continuously variable transmission 18 is exemplified as the automatic transmission included in the vehicle 10. If this automatic transmission is the continuously variable transmission 18, the variation in the engine rotation speed Ne tends to occur when the gear ratio γ is continuously changed from the maximum gear ratio γmax at the vehicle start and, therefore, the application of the present invention is particularly useful. However, even if the automatic transmission is a stepped transmission, since an upshift may immediately be made at the vehicle start and the vehicle may be in such a running state (region) in which the L/U control overlaps with a shift of the stepped transmission, the present invention may be applicable.

In the flowchart of FIG. 6 of the example, for example, if a form of implementation is not differentiated between permission and non-permission of the L/U clutch pressure learning control, the present invention is achieved even without including S20 and S60. As described above, the steps in the flowchart of FIG. 6 can be changed as needed without causing inconvenience.

Although the wrong learning region is exemplified by the low vehicle speed region and the low-side gear ratio region, i.e., regions in which the engine rotation speed Ne is predicted to vary by the predetermined value or more due to a shift of the continuously variable transmission 18 in the example, this form is not a limitation. For example, it may be determined whether the running state of the vehicle 10 is within the wrong learning region when the engine rotation speed Ne actually varies by a predetermined value or more. In such a case, the second predetermined running state is a state in which a change amount of the engine rotation speed Ne is equal to or greater than a predetermined value, for example. The engagement of the L/U clutch 15 is properly inhibited also in this way in the running state in which an excessive variation in the engine rotation speed Ne tends to occur during learning due to a shift of the continuously variable transmission 18 when the L/U clutch pressure learning control is provided.

Although the engine 12 is exemplified as the drive power source for running included in the vehicle 10 in this example, this form is not a limitation. For example, although a gasoline engine or a diesel engine is used for this drive power source for running, another motor such as an electric motor may be employed in combination with the engine 12. Although the power of the engine 12 is transmitted via the torque converter 14 to the continuously variable transmission 18, this form is not a limitation. For example, another fluid power transmission device such as a fluid coupling without a torque amplification effect may be used instead of the torque converter 14.

The above description is merely an embodiment and the present invention can be implemented in variously modified and improved forms based on the knowledge of those skilled in the art.

NOMENCLATURE OF REFERENCE SIGNS

10: vehicle
12: engine
14: torque converter (fluid power transmission device)
14p: pump impeller (input rotating member)
14t: turbine impeller (output rotating member)
15: lockup clutch
18: belt type continuously variable transmission (automatic transmission)
50: electronic control device (control device)

What is claimed is:

1. A vehicle control device of a vehicle including a lockup clutch configured to directly couple between input/output rotating members of a fluid power transmission device transmitting power of an engine to an automatic transmission, the vehicle control device comprising an electronic control unit configured to:
engage the lockup clutch when a running state of the vehicle is in a first predetermined running state;
provide lockup clutch pressure learning control of learning an oil pressure of the lockup clutch used in start-time lockup slip control in which the lockup clutch is placed in a slip-engaged state toward an engaged state at the start of the vehicle based on a rotation speed of the engine at the time of engagement of the lockup clutch;
inhibit engagement of the lockup clutch when the running state of the vehicle is in the first predetermined running state and in a second predetermined running state;
engage the lockup clutch after the running state of the vehicle goes out of the second predetermined running state; and
provide the lockup clutch pressure learning control in an engaging process of the lockup clutch, wherein:
the first predetermined running state is a running state of the vehicle that is in a predetermined region in which the lockup clutch is engaged; and
the second predetermined running state is a predetermined low vehicle speed state or a state in which a gear ratio of the automatic transmission is equal to or greater than a predetermined value.

2. The vehicle control device of claim 1, wherein the second predetermined running state is a state in which a change amount of rotation speed of the engine is equal to or greater than a predetermined value.

3. The vehicle control device of claim 1, wherein
when the running state of the vehicle is in the first predetermined running state and the lockup clutch pressure learning control is permitted, the lockup clutch is engaged after the running state of the vehicle goes out of the second predetermined running state, and
when the running state of the vehicle is in the first predetermined running state and the lockup clutch pressure learning control is not permitted, the lockup clutch is engaged regardless of whether the running state of the vehicle is in the second predetermined running state.

4. The vehicle control device of claim 1, wherein
a torque capacity of the lockup clutch is calculated by using an engine torque and a torque capacity of the fluid power transmission device calculated based on a rotation speed of the engine during engaging the lockup clutch, and
the lockup clutch pressure learning control is provided by correcting an oil pressure value of the lockup clutch according to whether a start time point of torque transmission through the lockup clutch determined based on the torque capacity is earlier or later than a target start time point.

* * * * *